(12) United States Patent
Takeda

(10) Patent No.: US 6,961,211 B2
(45) Date of Patent: Nov. 1, 2005

(54) DISK DRIVE APPARATUS HAVING AN ANNULAR STRAIGHTENING PORTION

(75) Inventor: Minoru Takeda, Akiruno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 200 days.

(21) Appl. No.: 10/408,348

(22) Filed: Apr. 8, 2003

(65) Prior Publication Data
US 2003/0202277 A1 Oct. 30, 2003

(30) Foreign Application Priority Data
Apr. 24, 2002 (JP) .................................. 2002-122724
Nov. 29, 2002 (JP) .................................. 2002-348304

(51) Int. Cl.$^7$ ................................................. G11B 5/40
(52) U.S. Cl. ............................ 360/98.08; 360/99.12
(58) Field of Search ...................... 360/97.01, 98.01, 360/99.12, 98.08

(56) References Cited

U.S. PATENT DOCUMENTS

| | | | | |
|---|---|---|---|---|
| 5,239,431 A | * | 8/1993 | Day et al. ................. | 360/98.08 |
| 5,982,581 A | * | 11/1999 | Kazmierczak et al. ... | 360/98.08 |
| 6,417,991 B1 | * | 7/2002 | Onda ......................... | 360/128 |
| 6,462,902 B1 | * | 10/2002 | Luo et al. ................. | 360/99.12 |
| 6,760,188 B2 | * | 7/2004 | Choo et al. .............. | 360/99.12 |
| 6,822,826 B2 | * | 11/2004 | Choo et al. .............. | 360/99.12 |

FOREIGN PATENT DOCUMENTS

| | | |
|---|---|---|
| JP | 57-71292 | 5/1982 |
| JP | 58-68279 | 4/1983 |
| JP | 61-189450 | 11/1986 |
| JP | 8-293191 | 11/1996 |
| JP | 10-162548 | 6/1998 |
| JP | 2001-12549 | 1/2001 |
| JP | 2001-338482 | 12/2001 |

OTHER PUBLICATIONS

Japanese Office Action, dated Jul. 13, 2004, for Patent Application No. 2002-122724.

Office Action, dated May 25, 2004, from the Japanese Patent Office for Patent Application No. 2002-348304.

* cited by examiner

*Primary Examiner*—Jefferson Evans
(74) *Attorney, Agent, or Firm*—Pillsbury Winthrop Shaw Pittman, LLP

(57) ABSTRACT

A spindle motor including a rotatable hub is provided on a case, and a disk is fitted on an outer periphery of the hub. A disk damper is fixed to an end portion of the hub to hold the disk on the hub. The disk damper integrally includes a clamp portion fixed to the end portion of the hub to hold a centre portion of the disk, and a substantially annular straightening portion extending outwards from the clamp portion in a radial direction and facing to a surface of the disk with a predetermined gap.

14 Claims, 5 Drawing Sheets

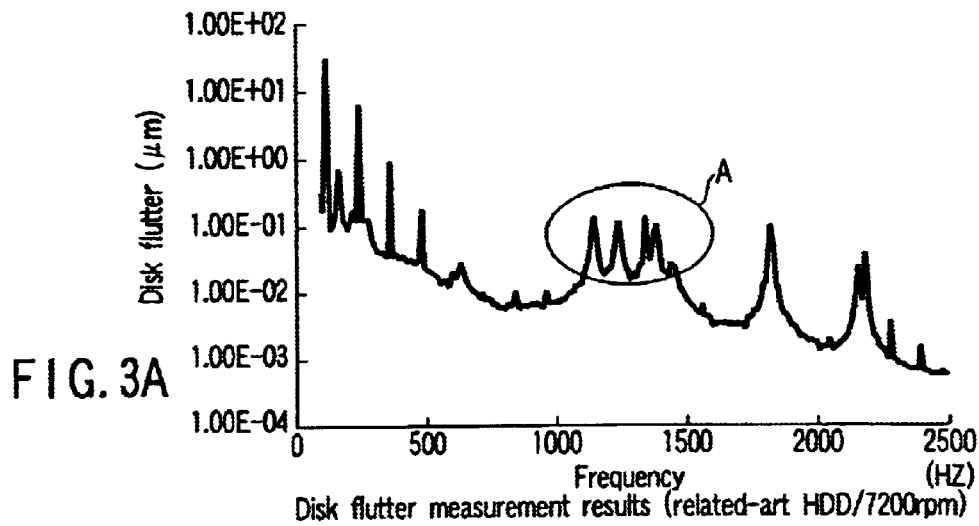
FIG. 3A Disk flutter measurement results (related-art HDD/7200rpm)
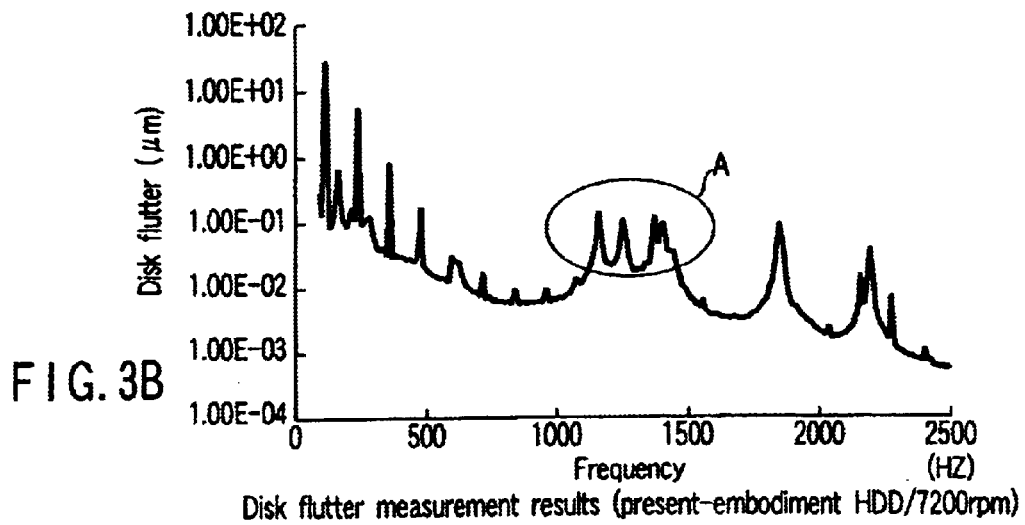
FIG. 3B Disk flutter measurement results (present-embodiment HDD/7200rpm)
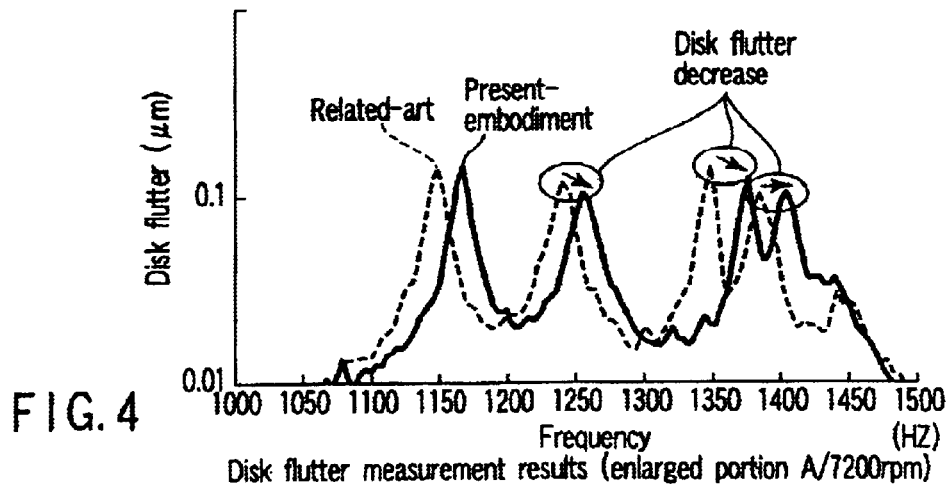
FIG. 4 Disk flutter measurement results (enlarged portion A/7200rpm)

DISK DRIVE APPARATUS HAVING AN ANNULAR STRAIGHTENING PORTION

CROSS-REFERENCE TO RELATED APPLICATIONS

This application is based upon and claims the benefit of priority from the prior Japanese Patent Applications No. 2002-122724, filed Apr. 24, 2002; and No. 2002-348304, filed Nov. 29, 2002, the entire contents of both of which are incorporated herein by reference.

BACKGROUND OF THE INVENTION

1. Field of the Invention

The present invention relates to disk drive apparatuses such as a magnetic disk drive including a disk which rotates at high speed.

2. Description of the Related Art

In general, a magnetic disk apparatus includes a case in which are provided a magnetic disk, a spindle motor which supports and rotates the magnetic disk, a carriage assembly supporting a magnetic head, a voice coil motor which drives the carriage assembly, and a substrate unit.

The spindle motor includes a cylindrical hub, and a plurality of magnetic disks and spacer rings are alternately stacked on the hub. Moreover, these magnetic disks and spacer rings are fixed onto the outer periphery of the hub by a disk damper attached to a tip end of the hub.

In this magnetic disk apparatus, the number of revolutions of the magnetic disk needs to be raised in order to carry out high-speed data processing. In recent years, a high-speed rotating type magnetic disk apparatus has been researched. However, when the magnetic disk rotates at high speed, an air current is generated in the same rotation direction as that of the magnetic disk. Turbulence of the air current causes a phenomenon called disk flutter in which the magnetic disk vibrates. In this case, positioning precision of the magnetic head with respect to the magnetic disk drops, and a problem is generated in enhancing recording density.

To solve the above-described problem, according to the magnetic disk apparatus disclosed, for example, in Jpn. Pat. Appln. KOKAI Publication No. 10-162548, a circulatory current channel is formed to generate a forced current toward the outer periphery from an inner periphery during the rotation of a magnetic disk, and the turbulence of the air current is suppressed in order to reduce the disk flutter.

In the magnetic disk apparatus, a method for forming the circulatory channel comprises: processing cutouts or taper portions for passing air in the hub and spacer of the spindle motor; and additionally forming an air introduction channel for introducing the air current into these cutouts or taper portions in the base and top cover of the magnetic disk apparatus.

However, in the magnetic disk apparatus which requires a high recording density, processing precisions of components directly influence an apparatus capability. Therefore, when the individual components are processed to form the circulatory channel, increases of processing and finishing costs cannot be avoided with the increase of the number of portions to be processed.

In order to prevent the disk flutter, a magnetic disk apparatus has also been proposed in which the shape of the top cover is changed or another component is disposed. However, any apparatus has many problems to be solved such as substantial change in a shape, increase in the number of components, and securing of assembly precision.

BRIEF SUMMARY OF THE INVENTION

According to an embodiment of the present invention, there is provided a disk drive apparatus comprising: a motor having a rotatable hub and attached to the case; a disk having an inner hole through which the hub is inserted and fitted on an outer periphery of the hub; and a disk damper fixed to an end portion of the hub to hold the disk on the hub, the disk damper including a clamp portion fixed to the end portion of the hub and hold a center portion of the disk, and an annular straightening portion extending outwards from the clamp portion in a radial direction and facing a surface of the disk with a predetermined gap, the straightening portion being formed integrally with the clamp portion.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3A is a diagram showing a measurement result of disk flutter in a related-art HDD;

FIG. 3B is a diagram showing the measurement result of the disk flutter in the HDD according to the present embodiment;

FIG. 4 is a diagram comparing and showing the measurement results of the disk flutter in the HDD according to the present embodiment and related-art HDD;

DETAILED DESCRIPTION OF THE INVENTION

A hard disk drive (hereinafter referred to as an HDD) according to an embodiment of the present invention will be described in detail with reference to the drawings.

Figure 1:
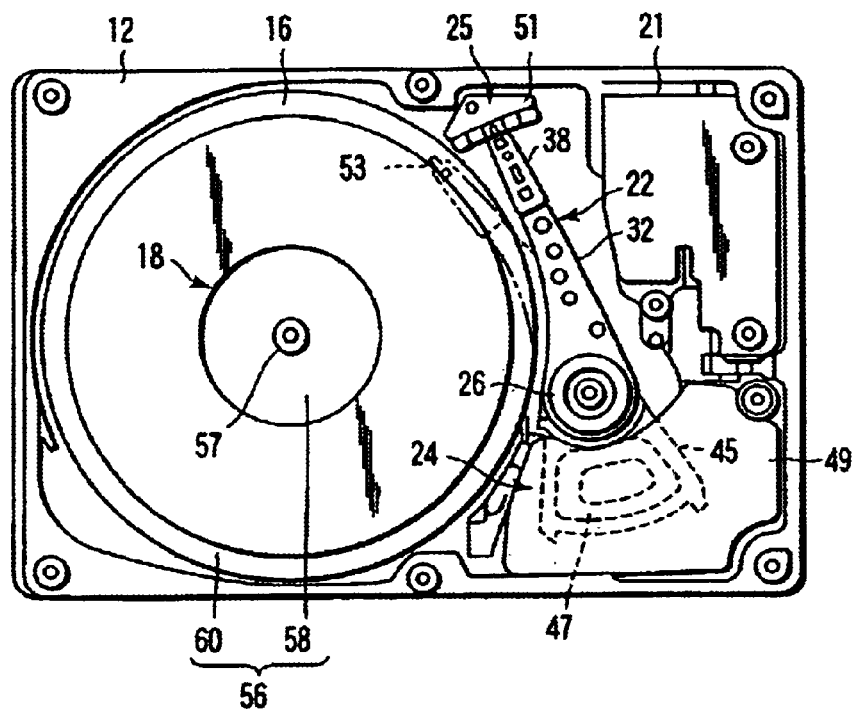
FIG. 1 is a plan view showing the inside of an HDD according to an embodiment of the present invention.
Figure 2:
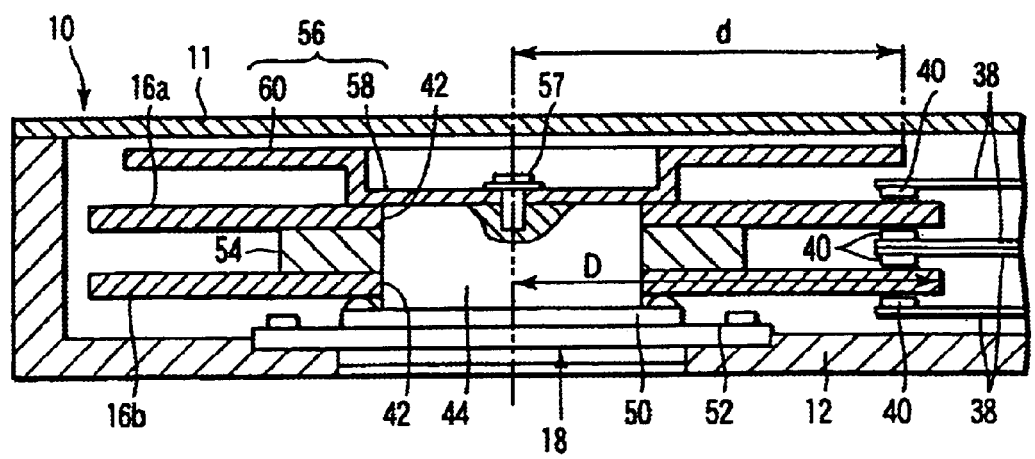
FIG. 2 is a sectional view showing a case, spindle motor, and magnetic disk of the HDD.

As shown in FIGS. 1 and 2, the HDD includes a case 10. The case includes a rectangular box shaped base 12 having an upper opening, and a top cover 11 fixed to the base by a plurality of screws and closing the upper-end opening of the base.

In the case 10, a spindle motor 18 fixed to a bottom wall of the base 12, and two magnetic disks 16a and 16b supported and rotated by the spindle motor are disposed. The case 10 contains a plurality of magnetic heads for recording/reproducing information with respect to the magnetic disks 16a and 16b, a carriage assembly 22 supporting the magnetic heads to be movable with respect to the magnetic disks 16a and 16b, a voice coil motor (hereinafter referred to as a VCM) 24 which rotates and positions the carriage assembly, a ramp load mechanism 25 for holding the magnetic heads in a retreat position distant from the magnetic disks, when the magnetic heads move to an outermost periphery of each magnetic disk, and a substrate unit 21 including a preamplifier and the like.

A printed circuit board (not shown) for controlling the operations of the spindle motor 18, VCM 24, and magnetic heads via the substrate unit 21 is screwed onto the bottom-wall outer surface of the base 12.

As shown in FIGS. 1 and 2, the carriage assembly 22 includes a bearing portion 26 provided on the bottom wall of the base 12, and a plurality of arms 32 extending from the bearing portion. These arms 32 extend in the same direction from the bearing portion 26 and substantially in parallel to the surfaces of the magnetic disks 16a and 16b, and are positioned with predetermined intervals from one another. Moreover, the carriage assembly 22 includes elongated plate shaped suspensions 38 which are elastically deformable. Each suspension 38 is constituted of a leaf spring, the base end of the suspension is fixed to the distal end of the arm 32 by spot welding or bonding, and the suspension extends from the arm 32. It is to be noted that each suspension 38 may also be formed integrally with the corresponding arm 32.

Gimbal portions (not shown) are disposed on the extending ends of the suspensions 38, and magnetic heads 40 are attached to the respective gimbal portions. The magnetic head 40 includes a substantially rectangular slider, and a recording head and a reproducing head which are formed in the slider. A Magneto Resistive (MR) head or Great Magneto Resistive (GMR) head is applied to the reproducing head. For four magnetic heads 40 attached to the respective suspensions 38, two heads are positioned opposite to each other with interposing the corresponding magnetic disk between them.

The carriage assembly 22 includes a support frame 45 extending from the bearing portion 26 in a direction opposite to that of the arm 32, and this support frame supports a voice coil 47 constituting a part of the VCM 24. The support frame 45 is formed integrally with the outer periphery of the voice coil 47 by a synthetic resin. The voice coil 47 is positioned between a pair of yokes 49 fixed on the base 12, and these yokes constitute the VCM 24 together with a magnet (not shown) fixed on one yoke. When the voice coil 47 is energized, the carriage assembly 22 rotates around the bearing portion 26, and the magnetic heads 40 are moved and positioned on desired tracks of the magnetic disks 16a and 16b.

The ramp load mechanism 25 includes a ramp 51 disposed on the bottom wall of the base 12 and disposed outside the magnetic disks 16a and 16b, and a tab 53 extending from the tip end of each suspension 38. When the carriage assembly 22 rotates to the retreat position outside the magnetic disks 16a and 16b, the tabs 53 engage ramp surfaces formed in the ramp 51, and are thereafter raised by the slope of the ramp surfaces to carry out an unload operation of the magnetic heads.

As shown in FIGS. 1 and 2, each of the magnetic disks 16a and 16b is formed with a diameter of 65 mm (2.5 inches), and includes an inner hole 42 in the center portion thereof and magnetic recording layers in upper and lower surfaces thereof. The spindle motor 18 is constituted of an outer rotor-type spindle motor. The spindle motor 18 includes a cylindrical hub 44 which functions as a rotor. Two magnetic disks 16a and 16b are fitted on the outer peripheral surface of the hub 44 coaxially with each other, and stacked at a predetermined interval in the axial direction of the hub. The magnetic disks 16a and 16b are rotated integrally with the hub 44 at a predetermined speed by the spindle motor 18.

More specifically, a flange 50 which functions as a disk receiving portion is formed in a lower end outer periphery of the rotatable hub 44. The spindle motor 18 is fixed at a predetermined position in the case 10 while fixing a motor bracket 52 to the bottom wall of the base 12 with screws.

Two magnetic disks 16a and 16b are fitted on the outer peripheral surface of the hub while the hub 44 is passed through the inner holes 42 of the disks, and are stacked on the flange 50. A spacer ring 54 is fitted on in the outer periphery of the hub 44, and is interposed between the magnetic disks 16a and 16b. These magnetic disks 16a and 16b and spacer ring 54 are fastened onto the hub 44 by a disk damper 56 which is fixed to the upper end surface of the hub 44. The disk clamper 56 is rotated integrally with the hub 44 and magnetic disks 16a and 16b.

The disk damper 56 includes a disc-shaped clamp portion 58 having an outer diameter slightly larger than the diameter of the hub 44, and a substantially annular straightening plate 60 extending outwards from the clamp portion in a radial direction. The disk damper 56 is integrally formed by bending a stainless plate with a plate thickness is, for example, about 0.6 mm.

The clamp portion 58 is fixed to the hub 44 via a screw 57 to closely contact the upper end surface of the hub. The outer peripheral portion of the clamp portion 58 abuts on the middle portion upper surface of the upper magnetic disk 16a to press two magnetic disks 16a and 16b and spacer ring 54 toward the flange 50 of the hub 44. Thereby, the magnetic disks 16a and 16b and spacer ring 54 are held between the flange 50 and clamp portion 58, and fixed onto the hub 44 in a mutual close contact state.

The straightening plate 60 of the disk clamper 56 is formed higher than the clamp portion 58 by one step, and is opposite to the surface of the magnetic disk 16a with a predetermined gap. The surface of the straightening plate 60 opposing the magnetic disk 16a is formed in a smooth flat surface. The interval between the straightening plate 60 and magnetic disk surface is set to a minimum in a range in which the magnetic head 40 and carriage assembly 22 moving on the magnetic disk 16a do not interfere with the straightening plate 60. For example, the interval is set to 0.85 mm or less, and set to 0.85 mm in the present embodiment. The interval between the straightening plate 60 and the inner surface of the top cover 11 is set to a minimum gap by which the straightening plate does not contact the top cover, and the dimension is set to 0.7 mm or less. In the present embodiment, the dimension is set to 0.7 mm.

An outer radius d of the straightening plate 60 is formed in 50 to 110% of an outer radius D of the magnetic disk, preferably in 75 to 100% thereof, in consideration of straightening effect of the straightening plate 60 and interference with the other constituting components. In the present embodiment, the outer radius d of the straightening plate 60 is set to about 90% of the outer radius D of the magnetic disks 16a and 16b.

According to the HDD constituted as described above, the outer radius d of the disk damper 56 which fixes the magnetic disks 16a and 16b is enlarged to the substantially same degree as that of the outer radius D of the magnetic disk. Thereby, a space between the magnetic disk and the top cover 11 can effectively be decreased by the disk damper 56. Additionally, the straightening plate 60 of the disk damper 56 approaches the magnetic disk 16a in a range in which the portion does not interfere with the magnetic head 40 and carriage assembly 22. Moreover, the disk damper 56 is screwed to the hub 44, and rotates integrally with the magnetic disks 16a and 16b. Therefore, without changing the shape of the top cover or adding another member for exclusive use, it is possible to straighten the air current on the magnetic disk surface by the disk damper 56 which includes the straightening plate 60.

As a result, even when the magnetic disks 16a and 16b rotate at high speed, the air current generated in the vicinity of the magnetic disk, particularly the air current between the magnetic disk and the top cover is straightened, and disk flutter by turbulence of the air current can be reduced. Therefore, there can be provided an HDD wherein vibration of the magnetic disks is reduced, and positioning precision of the head with respect to the magnetic disk is enhanced, without increasing the manufacturing cost thereof.

An HDD including the disk damper according to the above-described embodiment, and an HDD including a related-art disk damper were prepared, and disk flutters in a vertical direction with respect to the magnetic disk surface were measured with respect to the respective HDDs. Measurement results of the related-art HDD are shown in FIG. 3A, and that of the HDD according to the present embodiment are shown in FIG. 3B. Moreover, results of comparison of measurement result portions shown by circles A are shown in FIG. 4 in an enlarged size. A laser Doppler vibration meter (LDV) was used in measuring the disk flutter, and the spectrum of each frequency was measured with an FFT analyzer.

In FIGS. 3A and 3B, a spectrum peak includes a component at integer times the rotational speed by swell of the magnetic disk surface, and the disk flutter component of the vibration caused by turbulence of the air current. In FIG. 4, three circled portions indicate peaks by the disk flutter components. It is seen that the disk flutter of the HDD according to the present embodiment decreases by about 5% compared with the related-art HDD.

Next, an HDD according to a second embodiment of the present invention will be described.

Figure 5:
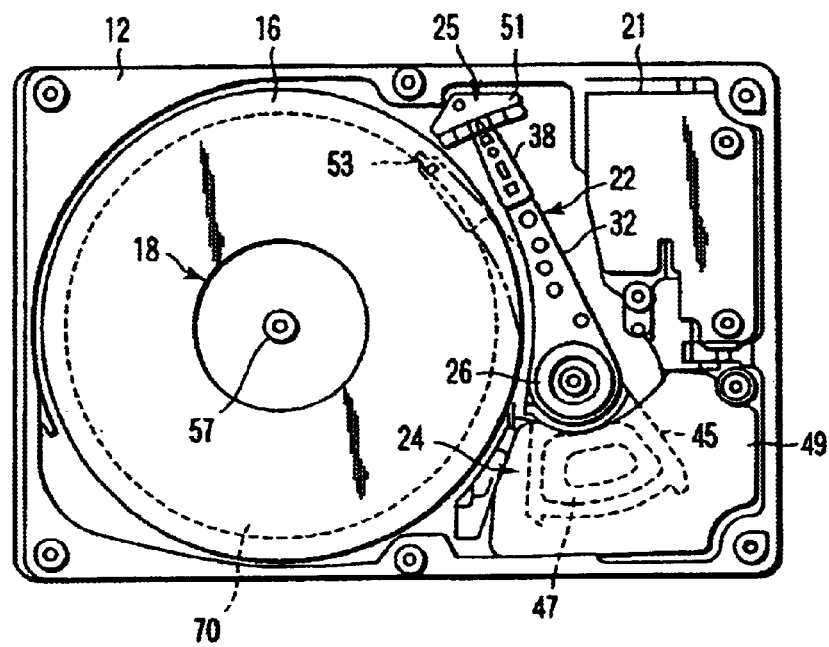
FIG. 5 is a plan view showing the inside of the HDD according to a second embodiment of the present invention.
Figure 6:
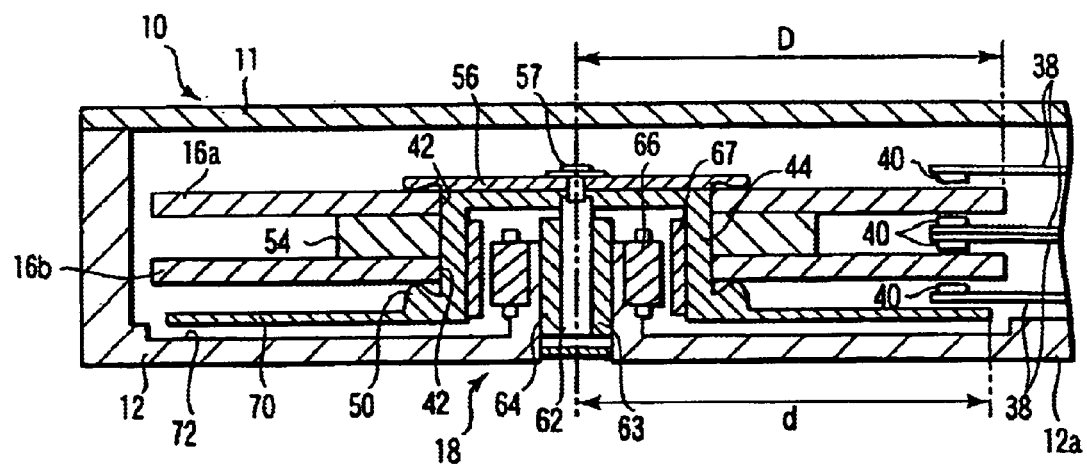
FIG. 6 is a sectional view showing the case, spindle motor, and magnetic disk of the HDD according to a second embodiment.

As shown in FIGS. 5 and 6, the spindle motor 18 of the HDD includes the hub 44 which functions as a rotor. Two magnetic disks 16a and 16b are fitted on the hub 44 coaxially with each other, and are stacked at a predetermined interval in the axial direction of the hub. The magnetic disks 16a and 16b are rotated/driven integrally with the hub 44 at a predetermined speed by the spindle motor 18.

The hub 44 of the spindle motor 18 is formed in a cylindrical shape whose upper end is closed. A spindle shaft 62 is disposed coaxially with the hub and integrally with the hub 44 inside the hub. A bottom wall 12a of the base 12 has a cylindrical portion 63 projecting into the case 10, and a bearing portion 64 is fitted in the inner periphery of the cylindrical portion. The spindle shaft 62 is inserted in the bearing portion 64 and rotatably supported by the bearing portion. Thus, the hub 44 is rotatably disposed in a predetermined position in the case 10. A stator 66 is provided on the outer peripheral portion of the bearing portion 64. A magnet 67 is coaxially fixed to the inner periphery of the hub 44 and disposed opposite to the stator 66 with a gap.

The flange-shaped disk receiving portion 50 is formed on the outer periphery of the lower end portion of the hub 44. Two magnetic disks 16a and 16b are fitted on the outer peripheral surface of the hub 44 in a state in which the hub 44 is inserted through the inner holes 42 of the disks, and are stacked on the disk receiving portion 50. A spacer ring 54 is fitted on the outer periphery of the hub 44, and held between the magnetic disks 16a and 16b. A disk damper 56 is fixed to the upper end surface of the hub 44 via the screw 57. The outer peripheral portion of the disk damper 56 abuts on the center portion of the upper surface of the upper magnetic disk 16a to press two magnetic disks 16a and 16b and spacer ring 54 toward the disk receiving portion 50 of the hub 44. Thereby, the magnetic disks 16a and 16b and spacer ring 54 are held between the disk receiving portion 50 and the disk damper 56, and fixed to the hub 44 in the mutual close contact state. The disk damper 56 is rotated integrally with the hub 44 and magnetic disks 16a and 16b.

According to the second embodiment, the hub 44 integrally includes a substantially annular straightening plate 70 extending outwards from the lower end outer periphery of the hub in the radial direction. The straightening plate 70 which functions as the straightening portion is formed, for example, of a stainless plate with plate thickness of about 0.6 mm. The straightening plate 70 is positioned coaxially with the hub 44 and magnetic disks 16a and 16b, and rotated integrally with the hub 44 and magnetic disks 16a and 16b. It is to be noted that a straightening plate formed separately from the hub 44 may be fixed to the hub.

The straightening plate 70 extends between the bottom wall 12a of the base 12 and the lower magnetic disk 16b, and faces to the surface of the magnetic disk 16b with a predetermined gap. The surface of the straightening plate 70 opposing the magnetic disk 16b is formed in the smooth flat surface. The interval between the straightening plate 70 and the magnetic disk 16b surface is set to the minimum in a range in which the magnetic head 40 and carriage assembly 22 moving on the magnetic disk 16b do not interfere with the straightening plate 70. For example, the interval is set to 0.85 mm or less, and set to 0.85 mm in the present embodiment.

A concave portion 72 is formed in the inner surface of the bottom wall 12a of the base 12, and a part of the straightening plate 70 is positioned in the concave portion 72. The interval between the straightening plate 70 and the inner surface of the bottom wall 12a is set to the minimum gap by which the straightening plate does not contact the bottom wall, and the dimension is set, for example, to 0.7 mm or less. In the present embodiment, the dimension is set to 0.7 mm. It is to be noted that the concave portion 72 of the base 12 can also be omitted.

The outer radius d of the straightening plate 70 is formed in 50 to 110% of the outer radius D of the magnetic disk 16b, preferably 75 to 100% thereof, in consideration of the straightening effect of the straightening plate and interference with the other constituting components. In the present embodiment, the outer radius d of the straightening plate 70 is set to about 90% of the outer radius D of the magnetic disks 16a and 16b.

The other constitution is the same as that of the first embodiment, the same components are denoted with the same reference numerals, and detailed description thereof is omitted.

According to the HDD constituted as described above, the straightening plate 70 is disposed on the hub 44 to which the magnetic disks 16a and 16b are attached, and the outer radius of the straightening plate is enlarged to substantially the same degree as that of the outer radius of the magnetic disk. Thereby, the space between the magnetic disk 16*b* and the bottom wall 12*a* of the base 12 can effectively be reduced by the straightening plate 70. Additionally, the straightening plate 70 is disposed in the vicinity of the lower magnetic disk 16*b* in the range in which the magnetic head 40 and carriage assembly 22 are not interfered. The straightening plate 70 rotates integrally with the hub 44 and magnetic disks 16*a* and 16*b*. Therefore, without adding another member for exclusive use, it is possible to straighten the air current on the magnetic disk surface by the straightening plate 70 which is integral with the hub 44.

As a result, even when the magnetic disks 16*a* and 16*b* rotate at high speed, the air current generated in the vicinity of the magnetic disk, particularly the air current between the magnetic disk 16*b* and the bottom wall 12*a* is straightened, and the disk flutter by the turbulence of the air current can be reduced. Thereby, there can be provided an HDD wherein the vibration of the magnetic disk is reduced, and the positioning precision of the head with respect to the magnetic disk is enhanced, without increasing manufacturing cost of the HDD.

Figure 7A:
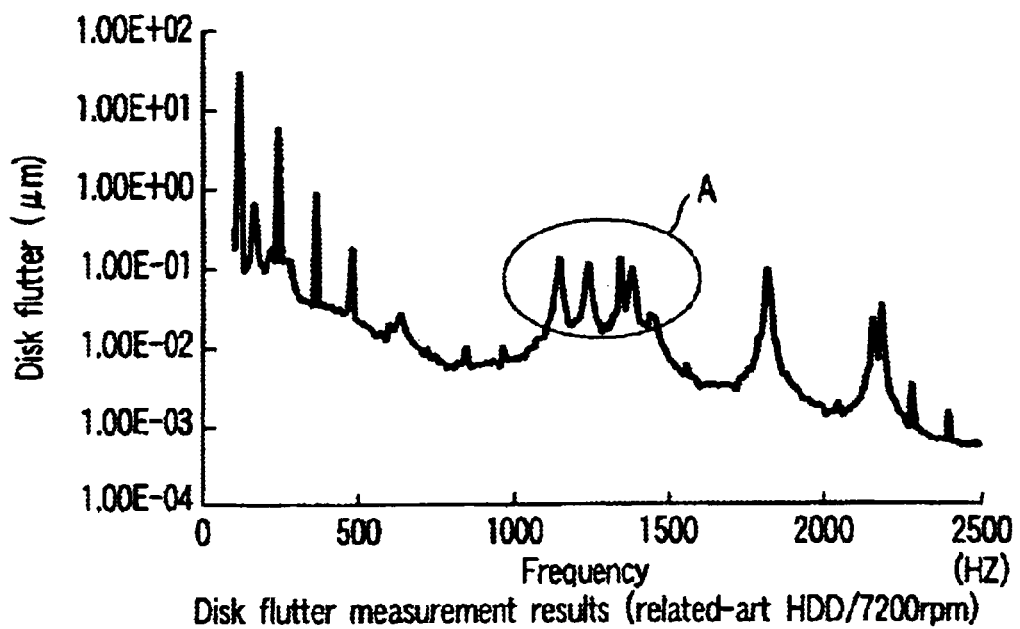
FIG. 7A is a diagram showing the measurement result of disk flutter in the related-art HDD.
Figure 7B:
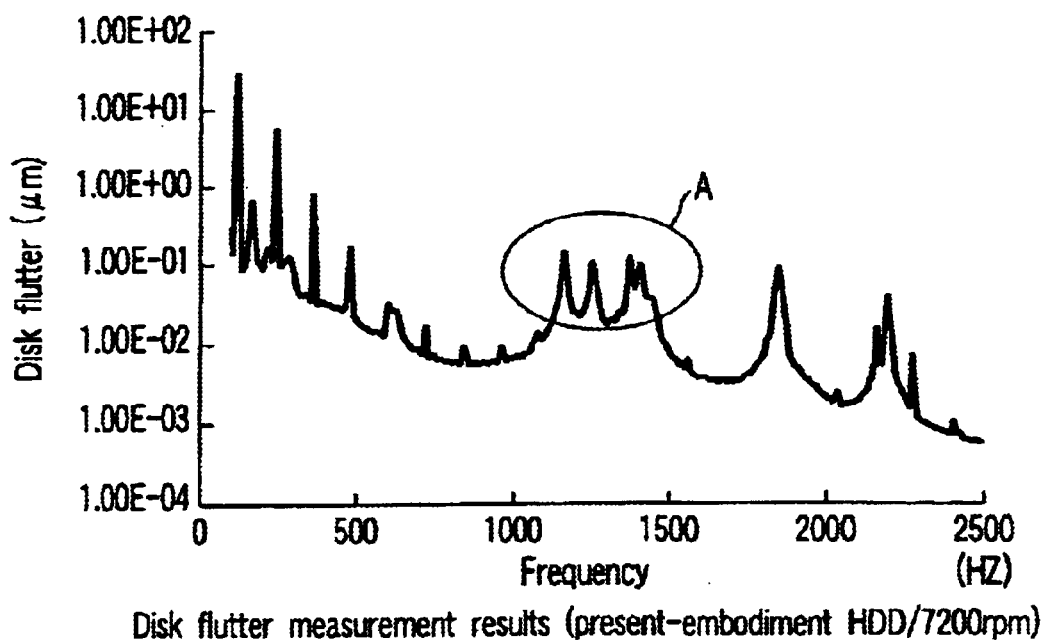
FIG. 7B is a diagram showing the measurement result of the disk flutter in the HDD according to the second embodiment.
Figure 8:
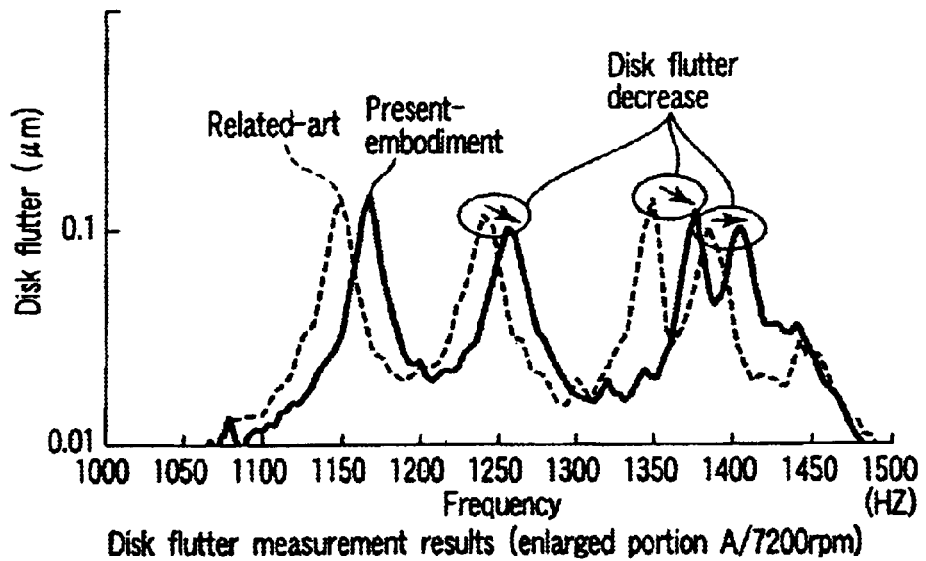
FIG. 8 is a diagram comparing and showing the measurement results of the disk flutter in the HDD according to the second embodiment and related-art HDD.

An HDD including the straightening plate 70 according to the above-described embodiment, and a related-art HDD not including any straightening member were prepared, and the disk flutters in the vertical direction with respect to the magnetic disk 16*b* surface were measured with respect to the respective HDDs. The measurement results of the related-art HDD are shown in FIG. 7A, and those of the HDD according to the present embodiment are shown in FIG. 7B. The results of comparison of these measurement result portions shown by the circles A are shown in FIG. 8 in the enlarged size. A laser Doppler vibration meter (LDV) was used in measuring the disk flutter, and the spectrum of each frequency was measured with an FFT analyzer.

In FIGS. 7A and 7B, the spectrum peak includes the component at integer times the rotation speed by the swell of the magnetic disk 16*b* surface and disk flutter component of the vibration caused by the turbulence of the air current. In FIG. 8, three circled portions indicate the peaks by the disk flutter components. It is seen that the disk flutter of the HDD according to the present embodiment decreases by about 5% compared with the related-art HDD.

Figure 9:
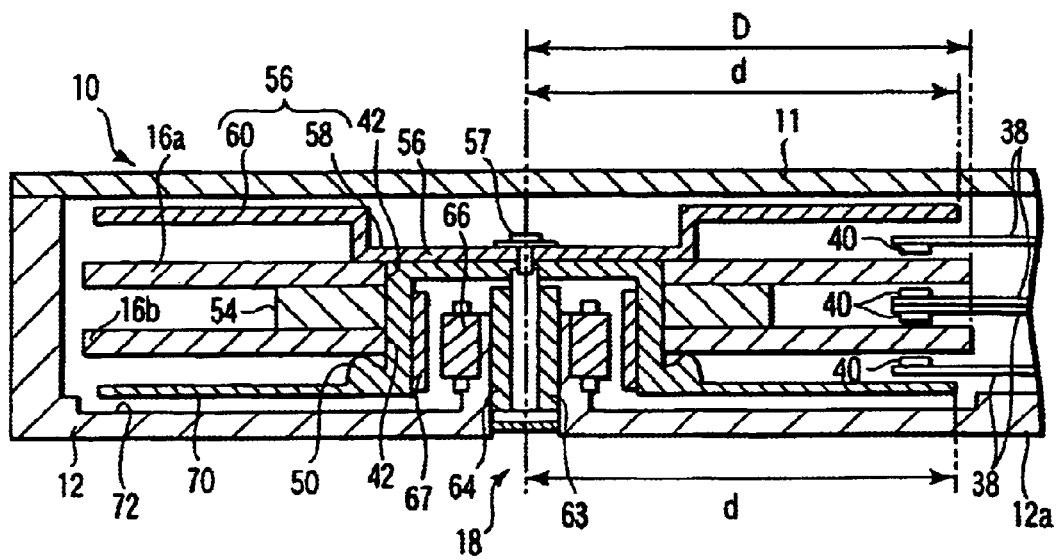
FIG. 9 is a sectional view showing the case, spindle motor, and magnetic disk of the HDD according to a third embodiment of the present invention.

Next, an HDD according to a third embodiment of the present invention will be described. As shown in FIG. 9, according to the third embodiment, a disk damper 56 attached to the hub 44 and rotated integrally with the hub. The disk damper 56 includes a disk-shaped clamp portion 58 having the outer diameter slightly larger than the diameter of the hub 44, and a substantially annular straightening plate 60 extending outwards from the clamp portion in the radial direction. The disk clamper 56 is integrally formed by bending a stainless plate with a plate thickness of, for example, about 0.6 mm.

The clamp portion 58 is fixed to the hub 44 via a screw 57 to closely contact the upper end surface of the hub. The outer peripheral portion of the clamp portion 58 abuts on the center portion upper surface of the upper magnetic disk 16*a* to press two magnetic disks 16*a* and 16*b* and spacer ring 54 toward the disk receiving portion 50 of the hub 44. Thereby, the magnetic disks 16*a* and 16*b* and spacer ring 54 are held between the flange 50 and the clamp portion 58, and fixed onto the hub 44 in the state in which the components closely contact with one another.

The straightening plate 60 of the disk damper 56 which functions as a straightening portion is formed higher than the clamp portion 58 by one step, and is disposed coaxially with the magnetic disks 16*a* and 16*b* and opposite to the surface of the magnetic disk 16*a* with a predetermined gap. The surface of the straightening plate 60 facing the magnetic disk 16*a* is formed in the smooth flat surface. The interval between the straightening plate 60 and the magnetic disk surface is set to the minimum in the range in which the magnetic head 40 and carriage assembly 22 moving on the magnetic disk 16*a* do not interfere with the straightening plate 60. For example, the interval is set to 0.85 mm or less, and set to 0.85 mm in the present embodiment. The interval between the straightening plate 60 and the inner surface of the top cover 11 is set to the minimum gap by which the straightening plate does not contact the top cover, and the dimension is set, for example, to 0.7 mm or less. In the present embodiment, the dimension is set to 0.7 mm.

The outer radius d of the straightening plate 60 is formed in 50 to 110% of the outer radius D of the magnetic disk, preferably 75 to 100% thereof, in consideration of the straightening effect of the straightening plate and the interference with the other constituting components. In the present embodiment, the outer radius d of the straightening plate 60 is set to about 90% of the outer radius D of the magnetic disks 16*a* and 16*b*.

The hub 44 of the spindle motor 18 integrally includes a straightening plate 70 in the same manner as in the second embodiment. The other constitution is the same as that of the second embodiment, the same components are denoted with the same reference numerals, and the detailed description thereof will be omitted.

According to the HDD constituted as described above, the outer radius of the disk damper 56 which fixes the magnetic disks 16*a* and 16*b* is enlarged to substantially the same degree as that of the outer radius of the magnetic disk. Thereby, the space between the magnetic disk and the top cover 11 can effectively be reduced by the disk clamper. Additionally, the straightening plate 60 of the disk damper 56 approaches the magnetic disk 16*a* in the range in which the plate does not interfere with the magnetic head 40 and carriage assembly 22. The disk damper 56 is screwed to the hub 44, and rotates integrally with the magnetic disks 16*a* and 16*b*. Therefore, without changing the shape of the top cover or adding another member for exclusive use, it is possible to straighten the air current on the magnetic disk 16*a* surface by the disk damper 56 which includes the straightening plate 60. In the same manner as in the above-described embodiment, the straightening plate 70 of the hub 44 can straighten the air current on the magnetic disk 16*b* surface.

As a result, even when the magnetic disks 16*a* and 16*b* rotate at high speed, the air current generated in the vicinity of the magnetic disks, particularly the air current between the magnetic disks 16*a* and 16*b* and case 10 is straightened, and disk flutter by the turbulence of the air current can be reduced. Thus, an HDD can be obtained in which the rise in the manufacturing cost is suppressed, the vibration of the magnetic disk is reduced, and the positioning precision of the head with respect to the magnetic disk is enhanced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

For example, in the above-described embodiments, the constitution including two magnetic disks has been described, but the number of magnetic disks can be increased/decreased if necessary. Moreover, the present invention can be applied not only to a magnetic disk apparatus but also to another disk drive apparatuses.

What is claimed is:

1. A disk drive apparatus comprising:
   a case:
   a motor having a rotatable hub and being attached to the case;
   a disk having an inner hole through which the hub is inserted, the disk being fitted on an outer periphery of the hub; and
   a disk clamper fixed to an end portion of the hub to hold the disk on the hub, the disk clamper including a clamp portion fixed to the end portion of the hub and being constructed and arranged to hold a center portion of the disk, the disk clamper also including an annular straightening portion extending outwards from the clamp portion in a radial direction, facing a surface of the disk, being distanced from the surface of the disk by a predetermined gap, and being formed integrally with the clamp portion,
   wherein an outer diameter of the straightening portion of the disk clamper is 50 to 110% of that of the disk.

2. The disk drive apparatus according claim 1, wherein an outer diameter of the straightening portion of the disk clamper is 75 to 100% of that of the disk.

3. The disk drive apparatus according to claim 1, further comprising:
   a head which processes information with respect to the disk,
   wherein the predetermined gap between the straightening portion of the disk clamper and the disk surface is set such that the straightening portion does not contact the head and is 0.85 mm or less.

4. The disk drive apparatus according to claim 1, wherein:
   the case comprises a base to which the motor is attached, an upper opening, and a top cover which closes the upper opening and which faces the straightening portion of the disk clamper,
   an interval between the top cover and the straightening portion is set such that the top cover does not contact the straightening portion and is 0.7 mm or less.

5. The disk drive apparatus according to claim 4, further comprising a carriage assembly arranged on the base and supporting the head to be movable with respect to the disk.

6. A disk drive apparatus comprising:
   a case;
   a motor having a rotatable hub and being disposed in the case;
   a disk having an inner hole through which the hub is inserted, the disk being fitted on an outer periphery of the hub; and
   an annular straightening plate extending outwards from the hub in a radial direction, rotatable integrally with the hub, facing a surface of the disk, and distanced from the surface of the disk by a predetermined gap,
   wherein an outer diameter of the straightening plate is 50 to 110% of that of the disk.

7. The disk drive apparatus according to claim 6, wherein the outer diameter of the straightening plate is 75 to 100% of that of the disk.

8. The disk drive apparatus according to claim 6, further comprising:
   a head which processes information with respect to the disk,
   wherein the predetermined gap between the straightening plate and the disk surface is set such that the straightening plate does not contact the head and is 0.85 mm or less.

9. The disk drive apparatus according to claim 6, further comprising:
   a disk clamper fixed to an end portion of the hub and being constructed and arranged to hold the disk on the hub,
   wherein the disk clamper comprises a clamp portion fixed to the end portion of the hub and being constructed and arranged to hold a center portion of the disk, and an annular straightening portion extending outwards from the clamp portion in a radial direction, facing a surface of the disk, being distanced from the surface of the disk by a predetermined gap, and being formed integrally with the clamp portion.

10. The disk drive apparatus according to claim 9, wherein an outer diameter of the straightening portion of the disk clamper is 50 to 110% of that of the disk.

11. The disk drive apparatus according to claim 10, wherein the outer diameter of the straightening portion of the disk clamper is 75 to 100% of that of the disk.

12. The disk drive apparatus according to claim 9, wherein the predetermined gap between the straightening portion of the disk clamper and the disk surface is set such that the straightening portion does not contact the head and is 0.85 mm or less.

13. The disk drive apparatus according to claim 9, further comprising:
   the case comprises a base on which the motor is arranged and an upper opening, and
   a top cover which closes the upper opening of the base and which faces the straightening portion of the disk clamper,
   wherein the interval between the top cover and straightening portion of the disk clamper is set such that the top cover does not contact the straightening portion and is 0.7 mm or less.

14. A disk drive apparatus comprising:
   a case including a bottom wall;
   a motor having a rotatable hub, the motor being disposed on the bottom wall;
   a disk having an inner hole through which the hub is inserted and fitted on an outer periphery of the hub; and
   an annular straightening plate extending outwards from the hub in a radial direction, rotatable integrally with the hub, facing a surface of the disk, and being distanced from the surface of the disk by a predetermined gap, the straightening plate being positioned between the disk and the bottom wall with the predetermined gap between the straightening plate and bottom wall being 0.7 mm or less.

* * * * *